United States Patent
Habibi

(10) Patent No.: US 11,505,127 B2
(45) Date of Patent: Nov. 22, 2022

(54) SYSTEM FOR AUTOMATICALLY DISPENSING SPACER BEADS FOR SPACING SUBSTRATES OF A MIRROR REFLECTIVE ELEMENT

(71) Applicant: Magna Mirrors of America, Inc., Holland, MI (US)

(72) Inventor: Hamid Habibi, Holland, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 199 days.

(21) Appl. No.: 16/949,688

(22) Filed: Nov. 11, 2020

(65) Prior Publication Data
US 2021/0146840 A1  May 20, 2021

Related U.S. Application Data

(60) Provisional application No. 62/935,271, filed on Nov. 14, 2019.

(51) Int. Cl.
*B60R 1/08* (2006.01)
*B60R 1/12* (2006.01)
*G02B 5/08* (2006.01)

(52) U.S. Cl.
CPC ............ *B60R 1/088* (2013.01); *B60R 1/12* (2013.01); *B60R 2001/1215* (2013.01); *G02B 5/0841* (2013.01)

(58) Field of Classification Search
CPC ... B60R 1/088; B60R 1/12; B60R 2001/1215; G02B 5/0841; G02F 1/13392; G02F 1/161
See application file for complete search history.

(56) References Cited

U.S. PATENT DOCUMENTS

| | | | |
|---|---|---|---|
| 4,712,879 A | 12/1987 | Lynam et al. |
| 5,066,112 A | 11/1991 | Lynam et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |

(Continued)

*Primary Examiner* — Sath V Perungavoor
*Assistant Examiner* — Tyler B Edwards
(74) *Attorney, Agent, or Firm* — Honigman LLP

(57) ABSTRACT

A method for assembling an electro-optic mirror reflective element for a vehicular rearview mirror assembly includes providing a container having a plurality of holes for dispensing spacer beads, supporting the container over a dispensing area via an electrically powered shaking device, positioning a glass substrate at the dispensing area, and automatically shaking the container so that spacer beads fall through the holes in the container and onto the glass substrate. The shaking of the container is controlled so that the shaking device is deactivated after an appropriate amount of spacer beads are dispensed onto the glass substrate. The glass substrate is mated with another glass substrate with the dispensed spacer beads between the glass substrates and bounded by a perimeter seal. The cavity between the glass substrates is filled with an electro-optic medium, and the cavity is sealed with the electro-optic medium and spacer beads disposed therein.

21 Claims, 5 Drawing Sheets

(56) References Cited

U.S. PATENT DOCUMENTS

| | | | |
|---|---|---|---|
| 5,406,414 A | 4/1995 | O'Farrell et al. | |
| 5,525,264 A | 6/1996 | Cronin et al. | |
| 5,567,360 A | 10/1996 | Varaprasad et al. | |
| 5,610,756 A | 3/1997 | Lynam et al. | |
| 5,668,663 A | 9/1997 | Varaprasad et al. | |
| 5,724,187 A | 3/1998 | Varaprasad et al. | |
| 5,910,854 A | 6/1999 | Varaprasad et al. | |
| 5,940,201 A * | 8/1999 | Ash | G02F 1/161 359/267 |
| 6,002,511 A | 12/1999 | Varaprasad et al. | |
| 6,154,306 A | 11/2000 | Varaprasad et al. | |
| 6,157,480 A * | 12/2000 | Anderson | G02F 1/161 359/275 |
| 6,178,034 B1 | 1/2001 | Allemand et al. | |
| 6,449,082 B1 | 9/2002 | Agrawal et al. | |
| 6,690,268 B2 | 2/2004 | Schofield et al. | |
| 7,184,190 B2 | 2/2007 | McCabe et al. | |
| 7,195,381 B2 | 3/2007 | Lynam et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,360,932 B2 | 4/2008 | Uken et al. | |
| 7,626,749 B2 | 12/2009 | Baur et al. | |
| 8,049,640 B2 | 11/2011 | Uken et al. | |
| 8,277,059 B2 | 10/2012 | McCabe et al. | |
| 8,508,831 B2 | 8/2013 | De Wind et al. | |
| 8,529,108 B2 | 9/2013 | Uken et al. | |
| 8,730,553 B2 | 5/2014 | De Wind et al. | |
| 9,327,649 B2 | 5/2016 | Habibi | |
| 9,346,403 B2 | 5/2016 | Uken et al. | |
| 9,454,054 B2 | 9/2016 | Habibi et al. | |
| 9,598,016 B2 | 3/2017 | Blank et al. | |
| 2011/0299170 A1 * | 12/2011 | Harlow | B60R 1/088 359/604 |
| 2015/0097955 A1 | 4/2015 | De Wind et al. | |
| 2016/0068108 A1 | 3/2016 | Uken et al. | |

* cited by examiner

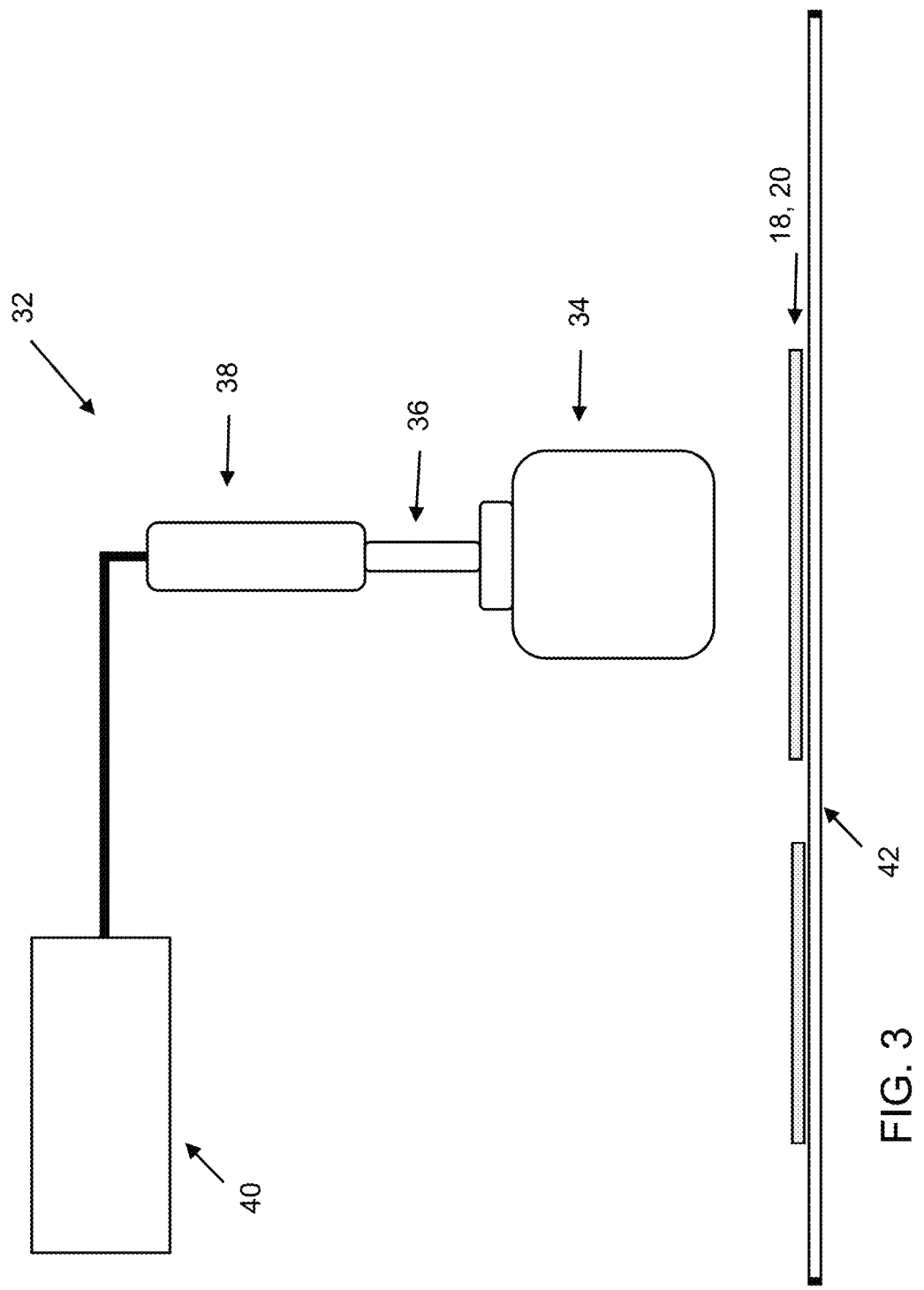

SYSTEM FOR AUTOMATICALLY DISPENSING SPACER BEADS FOR SPACING SUBSTRATES OF A MIRROR REFLECTIVE ELEMENT

CROSS REFERENCE TO RELATED APPLICATION

The present application claims the filing benefits of U.S. provisional application Ser. No. 62/935,271, filed Nov. 14, 2019, which is hereby incorporated herein by reference in its entirety.

FIELD OF THE INVENTION

The present invention relates generally to the field of electro-optic rearview mirror assemblies for vehicles.

BACKGROUND OF THE INVENTION

It is known to provide a mirror reflective element for an interior or exterior rearview mirror assembly of a vehicle. Variably reflectant electro-optic mirror reflective elements (such as, for example, electrochromic mirror reflective elements or cells) operate to automatically dim or darken to reduce glare to the driver of the vehicle. Such reflective elements comprise spaced apart glass substrates with an electro-optic or dimmable or darkenable material or medium disposed between the glass substrates. The spacing of the glass substrates and the interpane cavity between the glass substrates is typically established by a perimeter seal and spacer beads.

SUMMARY OF THE INVENTION

The present invention provides a method for automatically dispensing spacer beads onto a glass substrate for a variably reflectant (e.g., electro-optic or electrochromic or liquid crystal) mirror reflective element. The method includes providing a container having a plurality of holes for dispensing spacer beads, and supporting the container over a dispensing area via an electrically powered and automatically or robotically controlled shaking device. A glass substrate is positioned at the dispensing area, and (such as responsive to positioning the glass substrate at the dispensing area) the electrically powered shaking device is activated to shake or agitate the container so that spacer beads fall through the holes in the container and onto the glass substrate. The shaking of the container is controlled so that the shaking device is deactivated after an appropriate amount of spacer beads are dispensed onto the glass substrate. After the spacer beads are dispensed onto the glass substrate, the glass substrate is mated or joined with another glass substrate with the spacer beads between the glass substrates and bounded by a perimeter seal, such that a cavity is established between the glass substrates. The cavity is filled with an electro-optic medium and sealed with the electro-optic medium and spacer beads disposed therein.

These and other objects, advantages, purposes and features of the present invention will become apparent upon review of the following specification in conjunction with the drawings.

BRIEF DESCRIPTION OF THE DRAWINGS

FIG. 3 is a schematic showing the automatic spacer bead dispensing system;

DESCRIPTION OF THE PREFERRED EMBODIMENTS

Figure 1:
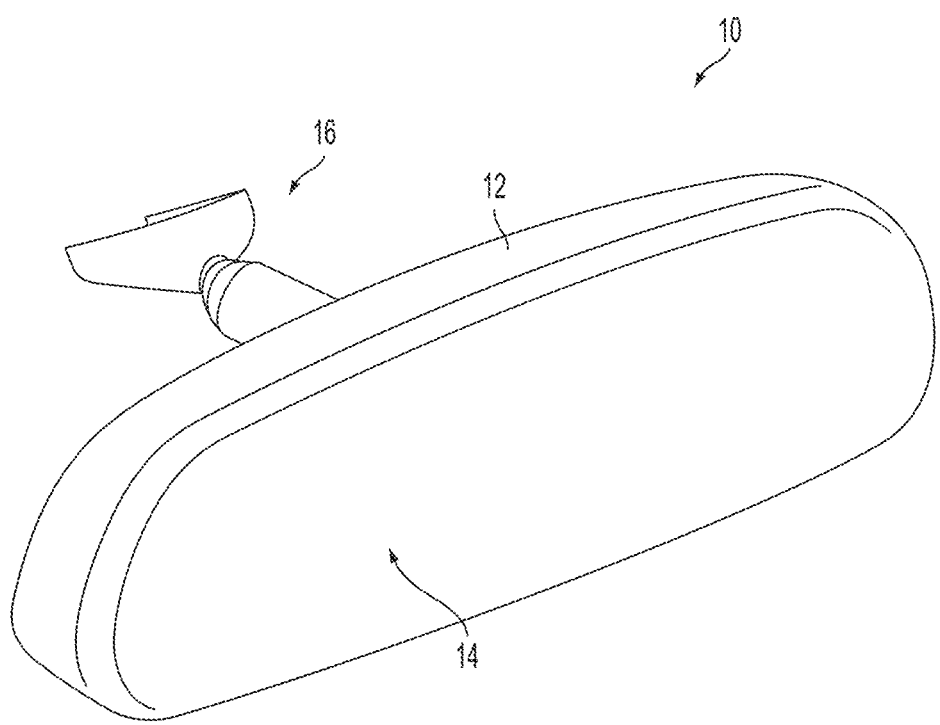
FIG. 1 is a perspective view of an interior rearview mirror assembly having an electro-optic mirror reflective element.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16.

Figure 2:
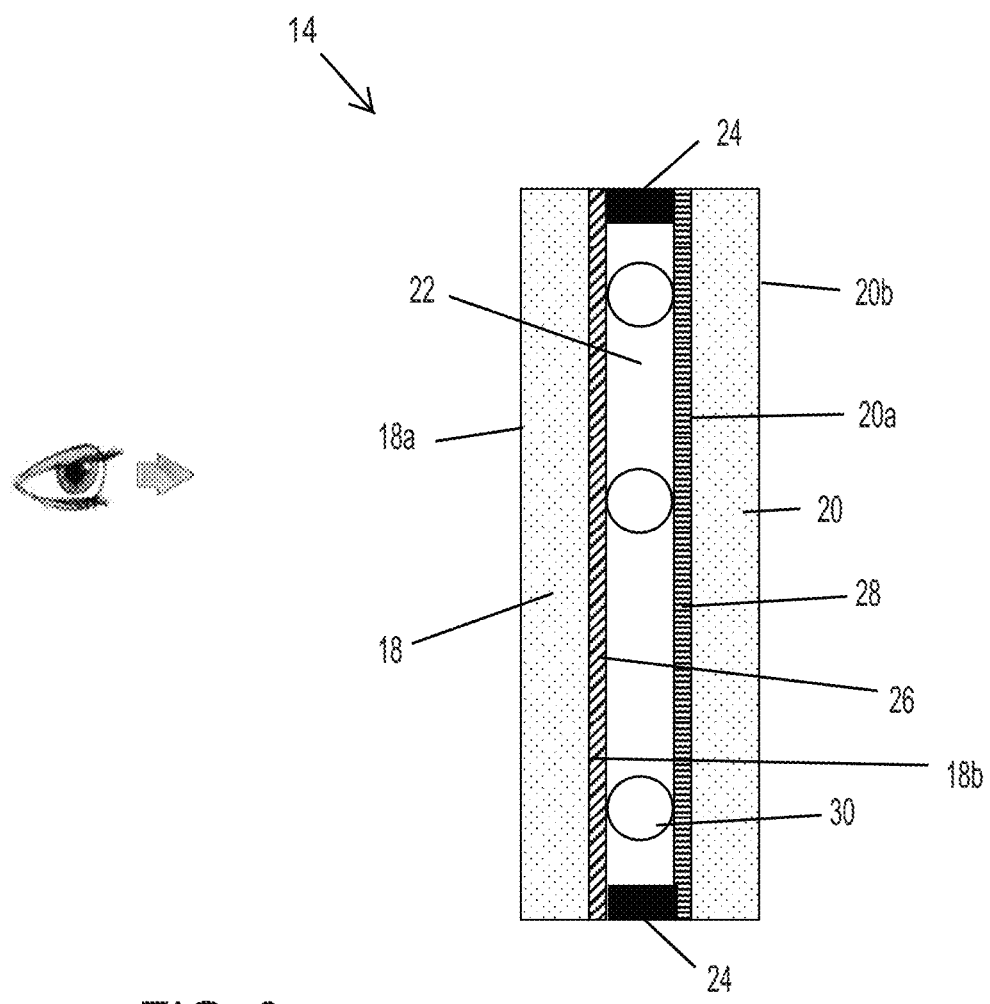
FIG. 2 is a sectional view of the mirror reflective element of the mirror assembly.

In the illustrated embodiment, and such as shown in FIG. 2, the mirror reflective element 14 comprises a laminate construction variable reflectance electro-optic (such as electrochromic) reflective element assembly having a front substrate 18 and a rear substrate 20 with an electro-optic medium 22 (such as electrochromic medium) sandwiched therebetween and bounded by a perimeter seal 24. As shown in FIG. 2, the front substrate 18 has a front or first surface 18*a* (the surface that generally faces the driver of a vehicle when the mirror assembly is normally mounted at the vehicle) and a rear or second surface 18*b* opposite the front surface 18*a*, and the rear substrate 20 has a front or third surface 20*a* and a rear or fourth surface 20*b* opposite the front surface 20*a*, with the electro-optic medium 22 disposed between the second surface 18*b* and the third surface 20*a* and bounded by the perimeter seal 24 of the reflective element (such as is known in the electrochromic mirror art). The second surface 18*a* has a transparent conductive coating 26 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 20*a* has a metallic reflector coating 28 (or multiple layers or coatings) established thereat. The front or third surface 20*a* of rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 9,327, 649; 7,626,749; 7,274,501; 7,255,451; 7,195,381; 7,184, 190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The third surface 20a defines the active EC area or surface of the rear substrate within the perimeter seal 24. The coated third surface 20a may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

The front substrate 18 and rear substrate 20 are spaced apart with the electro-optic medium 22 disposed therebetween. To ensure uniform spacing between the substrates, glass or polymeric beads 30 (such as polymethylmethacrylate (PMMA) beads) are disposed between the substrates. Although shown in FIG. 2 as part of the assembled mirror reflective element, the spacer beads may be dissolved after the mirror reflective element is assembled, since their spacing function is not needed after the interpane cavity has been vacuum filled with the electro-optic medium.

Electrochromic mirrors and LCD devices use such glass or polymeric spacer beads to maintain a uniform gap between two glass substrates. For electrochromic devices, the spacer beads are typically put into a metal can. The metal can has some small holes that are two or three times larger than the size of the spacer beads. The spacer beads are sprinkled on one substrate before the two pieces of glass are mated together. The process of applying the spacer beads is a manual process whereby an operator shakes the can over the substrate so that the beads fall toward the substrate. This causes a certain number of beads to fall on top of the glass substrate.

This process is highly variable and is highly dependent on the expertise of the operator to determine how many beads to put on the glass. If too many spacer beads are put on the glass, the spacer beads can clump and overlap and that will change the spacing between the two glass substrates. If too few beads are put on the glass, the device will collapse during the vacuum backfilling process since the spacer beads act as a support structure for maintaining the gap between the two glass substrates.

The present invention provides for automation of the bead dispensing using ultrasonic agitation of the bead container. This process automates the manual process of sprinkling beads on the glass. In this process, the container of spacer beads is coupled to an ultrasonic sonotrode (such a sonotrode may comprise a tool that creates ultrasonic vibrations and that comprises a stack of piezoelectric transducers attached to a support structure, such as a rod or ring, as discussed below). The ultrasonic agitation causes the beads to flow out of the container and fall onto the substrate below.

The system or process is an automated process where the number of beads are controlled by the size of the holes in the bottom of the spacer bead container, the number of such holes, the ultrasonic power and the amount of time the ultrasonic agitation stays on for a given glass substrate. The uniformity of bead distribution can be controlled by the position of holes relative to each other, the size of the spacer bead container and the distance from the substrate.

The ultrasonic agitation has the added advantage of shaking the spacer beads such that spacer beads will not clump together inside the container and it also stops the holes in the bottom of the spacer bead container from getting blinded. This will ensure a reliable flow of spacer beads.

As shown in FIG. 3, the bead dispensing system 32 includes a container 34 of spacer beads with the container positioned over a glass substrate (either the front glass substrate 18 or the rear glass substrate 20 of the reflective element) and attached to a sonotrode 36 and transducer 38, which is electrically connected to a power supply 40. As the glass substrate is positioned under the bead shaker, the ultrasonic sonotrode is turned on for a few seconds. The ultrasonic agitation will cause the beads to flow out of the small holes in the bottom of the container and fall on the substrate below.

Figure 4B:
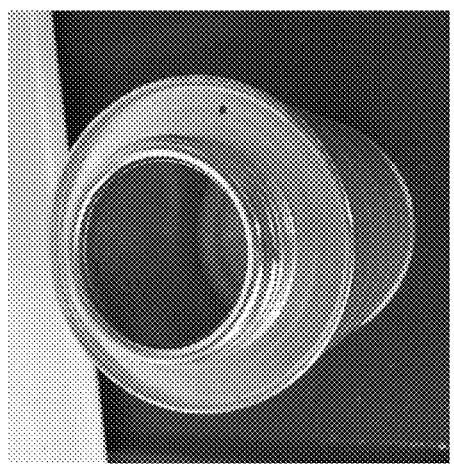
FIGS. 4A-C are views of a container suitable for containing the spacer beads and for being agitated to dispense the spacer beads onto the glass substrate.
Figure 4C:
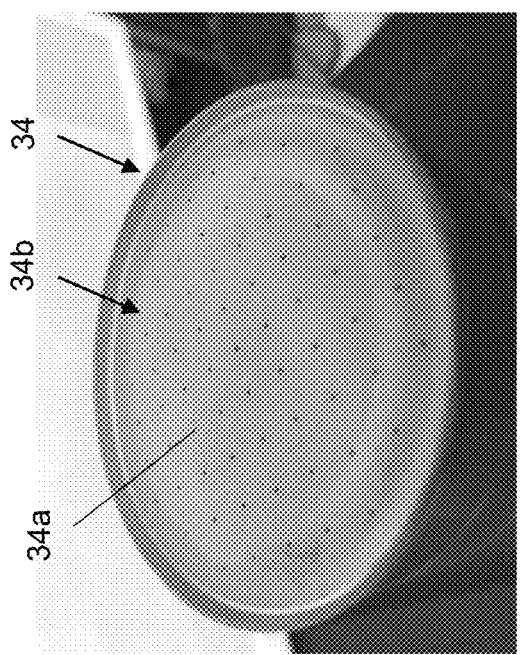
Figure 4A:
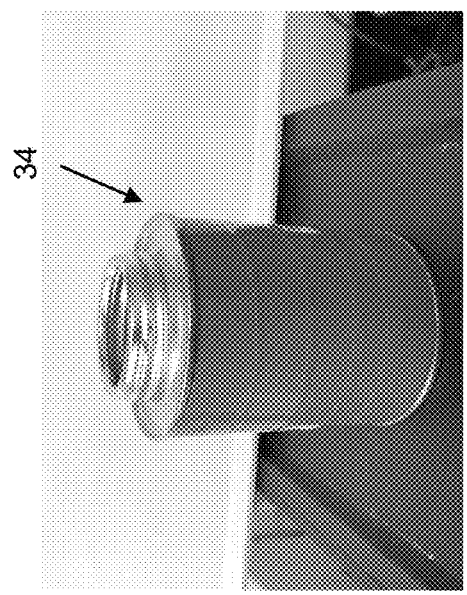

As shown in FIGS. 4A-C, the container 34 comprises any suitably shaped container that holds the spacer beads, with a plurality of small or very fine holes 34a established through its lower or bottom wall 34b. The holes 34a at the bottom of the container allow the spacer beads to flow out when the container is agitated, but are small enough (relative to the spacer beads) to not allow for free flowing of beads out the holes when the container is not agitated.

Figure 6:
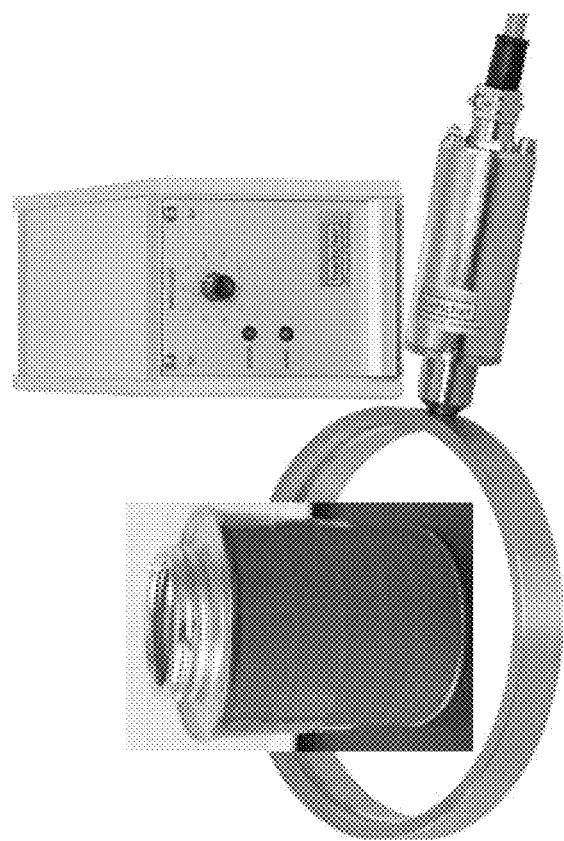
FIG. 6 is a perspective view showing the container attached to a support ring of an ultrasonic sonotrode.
Figure 5:
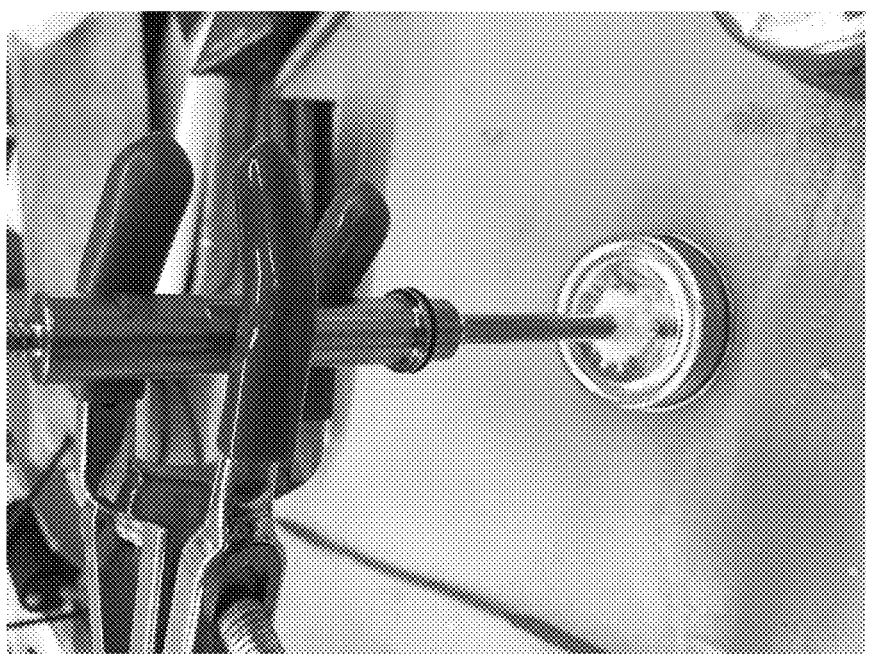
FIG. 5 is a perspective view showing the container attached to a support rod of an ultrasonic sonotrode.

The sonotrode may be attached to the middle of the top or cap of the container (FIG. 5), or the sonotrode may comprise a ring that at least partially circumscribes the sides of the container to hold the container (FIG. 6).

The spacer beads may comprise any suitable polymeric or glass beads that are smaller than the holes established through the bottom of the container. The container may comprise a transparent container or may have a transparent window to allow for inspection of how much beads are left. Optionally, the level of beads in the container may be monitored by the system, such as via a sensor that determines a level of beads, such as by sensing weight of the container or such as by optically sensing when the level of the beads drops below a threshold level in the container. Responsive to determining a level of beads below a threshold level, the system may automatically fill the reservoir with beads or may generate an alert to an operator so the operator can fill the container with beads.

The system controls operation of the bead dispenser, such as via a control unit or controller that activates and deactivates and optionally moves the bead dispenser and that optionally controls movement of the support at which the glass substrate is disposed.

Optionally, the glass substrate may be stationary and the bead dispenser may be moved or controlled to apply beads on a larger substrate, or the glass substrate may be moved or controlled under the agitated (but otherwise stationary) container. For example, the system may automatically activate the sonotrode and automatically move the container and/or glass substrate so that the container, while being agitated, dispenses the spacer beads onto the glass substrate. Optionally, the system may comprise a plurality of smaller stationary (but agitatable) dispensers or containers, where only a few agitators or sonotrodes are automatically turned on for a smaller part and more of the agitators or sonotrodes are automatically turned on for a larger part. The system may determine the size and/or shape of the part positioned below the container or containers (such as via processing of image data captured by a camera or sensor disposed at the dispensing system), and may control actuation of the appropriate sonotrodes and containers or movement of the container so that the spacer beads are dispensed over the surface area of the substrate.

Optionally, the glass substrates may be disposed on a conveyor 42 (FIG. 3) that moves the glass substrates through the dispensing area, whereby the automatic bead dispensing device is automatically activated and deactivated as the substrates are positioned at or moved through the dispensing area. The conveyor may continuously move the substrates through the dispensing area, whereby the shaking device may be episodically automatically activated when a glass substrate is disposed below the container at the dispensing area and may be automatically deactivated when there is no glass substrate disposed below the container at the dispensing area (such as between glass substrates arranged along the conveyor). The system thus automatically dispenses the spacer beads onto the glass substrate(s) with reduced waste of beads (as the system controls the dispensing of the beads so they are dispensed onto the glass substrate and not onto areas surrounding the glass substrate), and with enhanced uniformity of the layer of beads onto the glass substrate(s). If the conveyor conveys glass substrates of different sizes, the system automatically adjusts to the size of the glass substrate positioned below the container (such as responsive to identification of the particular size of the glass substrate, such as via processing of sensor data captured by a sensor at the dispensing area or other identification means, such as an input that indicates the size or type of glass substrates being conveyed and/or the number of shaking devices that should be activated for each glass substrate as it is conveyed through the dispensing area) and activates one or more of the shaking devices depending on whether one or more devices should be operated to dispense a sufficient amount of spacer beads on the glass substrate as the substrate is moved or conveyed through the dispensing area.

After the beads are dispensed onto the glass substrate, the glass substrate (which may be the front glass substrate, with the spacer beads dispensed on the transparent electrically conductive coated surface, or which may be the rear glass substrate, with the spacer beads dispensed on the metallic reflective electrically conductive coated surface) is moved to a station where the glass substrate is mated with or joined with the other glass substrate via a perimeter seal that circumscribes the interpane cavity formed by joining the glass substrates, with the spacer beads disposed in the cavity and functioning to maintain the spacing between the opposing surfaces of the glass substrates. The interpane cavity is then filled, such as via vacuum filling or the like, with an electro-optic or electrochromic medium and the cavity is sealed (such as via plugging a fill port of the perimeter seal), such as by utilizing aspects of the systems described in U.S. Pat. Nos. 9,454,054 and/or 5,140,455, and/or U.S. publication No. US-2011-0299170, which are hereby incorporated herein by reference in their entireties.

Thus, the mirror reflective element cell assembly includes a front substrate and a rear substrate and an electrochromic medium sandwiched therebetween and contained within an interpane cavity. The substrates are shaped as desired by the automobile manufacturer for a particular mirror design or application. For example, an interior rearview mirror reflective element may have substrates that are generally oval or trapezoidal in shape and are formed to be approximately 20-26 cm long and 5-8 cm tall or wide. Exterior mirror reflective element assemblies are shaped differently and may have sharper radii at the corners and may be flat or convex or aspheric, depending on the particular application. The size of the substrates for the exterior reflective element assemblies may vary from about 7 cm by 7 cm to about 10 cm by 18 cm or larger.

During the manufacture and assembly of the mirror reflective element or cell assembly, the respective front and rear substrates are often cut or broken out as cut shapes from larger flat or curved lites, typically glass sheets or lites. The individual front and rear cut shapes or glass substrates are cleaned and then coated with an electrically conductive or electrically semiconductive coating or coatings that are reflective or transparent. After they are coated, an uncured adhesive material, typically an uncured epoxy material (often containing spacer beads, such as glass beads or the like), is applied around the perimeter of one of the cut shapes or glass substrates, and the polymethylmethacrylate (PMMA) spacer beads are dispensed at the glass substrate and inboard of the epoxy material, and the other cut shape or glass substrate is superimposed thereupon and spaced apart from the first cut shape by the applied perimeter material and the spacer beads. The uncured adhesive material is then cured, such as by heating, to adhere the shapes or glass substrates together and to space the glass substrates apart a desired or appropriate or selected amount to define an appropriate interpane cavity spacing. The substrates, so adhered together and interspaced apart, form an empty cell with an interpane cavity between the substrates and bounded by the perimeter seal and uniformly maintained by the spacer beads.

Next, an electrolyte or monomer composition is filled into the cavity via an aperture (commonly known as a fill port or plug hole) provided in the perimeter material or seal, such as via a vacuum fill process. During the filling process, the interpane cavity may be in a vacuum and the empty cell may be disposed in a vacuum chamber. Thus, when the fill port is placed in a source of electrochromic fluid, and the chamber is pressurized or vented to atmosphere, the fluid is drawn up into the vacuumed interpane cavity to fill the cell. The spacer beads in the interpane cavity are required, at least for larger cells, to avoid collapsing of the cell when the chamber is at a higher pressure than the interpane cavity. After the cell is filled and the port is plugged, the cell may be heated to dissolve the beads, and the cell is cleaned to remove electrochromic fluid that may be present at the surface of the cell and around the fill port.

The mirror reflective element is part of an interior or exterior rearview mirror assembly. The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having the reflective element at least partially nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Publication Nos. US-2016-0068108 and/or US-2015-0097955, and/or U.S. Pat. Nos. 8,508,831; 8,730,553; 9,598,016 and/or 9,346,403, which are hereby incorporated herein by reference in their entireties (and with electrochromic and prismatic mirrors of such construction are commercially available from the assignee of this application under the trade name INFINITY™ mirror).

Changes and modifications in the specifically described embodiments may be carried out without departing from the principles of the present invention, which is intended to be limited only by the scope of the appended claims as interpreted according to the principles of patent law.

The invention claimed is:

1. A method for assembling an electro-optic mirror reflective element for a vehicular rearview mirror assembly, the method comprising:
  providing a container that contains a plurality of spacer beads, wherein the container has a plurality of holes for dispensing spacer beads from the container;
  supporting the container over a dispensing area via an electrically powered shaking device;
  positioning a glass substrate at the dispensing area;
  with the glass substrate positioned at the dispensing area, automatically shaking, via the electrically powered shaking device, the container so that spacer beads fall through the holes in the container and onto the glass substrate;
  controlling shaking of the container by the shaking device while the glass substrate is positioned at the dispensing area;
  deactivating the shaking device responsive to determination that an appropriate amount of spacer beads have been dispensed onto the glass substrate;
  mating the glass substrate with another glass substrate with the dispensed spacer beads between the glass substrates and bounded by a perimeter seal, wherein a cavity is established between the glass substrates by the perimeter seal and the dispensed spacer beads;
  filling the cavity with an electro-optic medium; and
  sealing the cavity with the electro-optic medium and the dispensed spacer beads disposed therein.

2. The method of claim 1, wherein the electrically powered shaking device comprises a transducer and an ultrasonic sonotrode.

3. The method of claim 1, wherein automatically shaking the container comprises automatically activating the shaking device responsive to the glass substrate being positioned at the dispensing area.

4. The method of claim 1, wherein controlling shaking of the container comprises shaking the container for a period of time following activation of the shaking device, and wherein deactivating the shaking device comprises automatically deactivating the shaking device when the period of time elapses.

5. The method of claim 1, further comprising moving the container over the dispensing area prior to automatically shaking the container via the shaking device to dispense the spacer beads onto the glass substrate.

6. The method of claim 1, wherein a plurality of containers and respective shaking devices are provided, and wherein automatically shaking the plurality of containers comprises selectively activating one or more of the shaking devices to dispense the spacer beads onto the glass substrate.

7. The method of claim 6, wherein selectively activating one or more of the shaking devices is responsive to determination of a size and/or shape of the glass substrate positioned at the dispensing area.

8. The method of claim 1, wherein controlling shaking of the container comprises shaking the container while the glass substrate is moved beneath the container to dispense the spacer beads onto the glass substrate.

9. The method of claim 1, comprising determining a level of spacer beads in the container, and wherein, responsive to determination of a level of spacer beads below a threshold level, the method further comprises automatically refilling the container with more spacer beads.

10. The method of claim 1, comprising determining a level of spacer beads in the container, and wherein, responsive to determination of a level of spacer beads below a threshold level, the method further comprises generating an alert.

11. A method for assembling an electro-optic mirror reflective element for a vehicular rearview mirror assembly, the method comprising:
  providing a container that contains a plurality of spacer beads, wherein the container has a plurality of holes for dispensing spacer beads from the container;
  supporting the container over a dispensing area via an electrically powered shaking device;
  positioning a glass substrate at the dispensing area;
  responsive to the glass substrate being positioned at the dispensing area, automatically activating the shaking device and shaking the container so that spacer beads fall through the holes in the container and onto the glass substrate;
  deactivating the shaking device responsive to a threshold period of time elapsing following activation of the shaking device;
  mating the glass substrate with another glass substrate with the dispensed spacer beads between the glass substrates and bounded by a perimeter seal, wherein a cavity is established between the glass substrates by the perimeter seal and the dispensed spacer beads;
  filling the cavity with an electro-optic medium; and
  sealing the cavity with the electro-optic medium and the dispensed spacer beads disposed therein.

12. The method of claim 11, wherein the electrically powered shaking device comprises a transducer and an ultrasonic sonotrode.

13. The method of claim 11, wherein controlling shaking of the container comprises shaking the container while the glass substrate is moved beneath the container to dispense the spacer beads onto the glass substrate.

14. The method of claim 11, comprising determining a level of spacer beads in the container, and wherein, responsive to determination of a level of spacer beads below a threshold level, the method further comprises automatically refilling the container with more spacer beads.

15. The method of claim 11, comprising determining a level of spacer beads in the container, and wherein, responsive to determination of a level of spacer beads below a threshold level, the method further comprises generating an alert.

16. The method of claim 11, wherein a plurality of containers and respective shaking devices are provided, and wherein automatically activating the shaking device comprises selectively activating one or more of the shaking devices to dispense the spacer beads onto the glass substrate.

17. The method of claim 16, wherein selectively activating one or more of the shaking devices is responsive to determination of a size and/or shape of the glass substrate positioned at the dispensing area.

18. A method for assembling an electro-optic mirror reflective element for a vehicular rearview mirror assembly, the method comprising:

provviding a container that contains a plurality of spacer beads, wherein the container has a plurality of holes for dispensing spacer beads from the container;

supporting the container over a dispensing area via an electrically powered shaking device;

positioning a plurality of glass substrates on a conveyor and moving the glass substrates via the conveyor through the dispensing area;

responsive to a glass substrate being positioned at the dispensing area, automatically activating the shaking device and shaking the container so that spacer beads fall through the holes in the container and onto the glass substrate positioned at the dispensing area;

deactivating the shaking device responsive to a threshold period of time elapsing following activation of the shaking device;

moving the glass substrates via the conveyor to move the glass substrate with the spacer beads dispensed thereat away from the dispensing area and to move another glass substrate on the conveyor to the dispensing area;

mating the glass substrate with the spacer beads dispensed thereat with another glass substrate with the dispensed spacer beads between the mated glass substrates and bounded by a perimeter seal, wherein a cavity is established between the mated glass substrates by the perimeter seal and the dispensed spacer beads;

filling the cavity with an electro-optic medium; and sealing the cavity with the electro-optic medium and the dispensed spacer beads disposed therein.

19. The method of claim 18, wherein moving the glass substrates via the conveyor comprises continuously moving the glass substrates via the conveyor such that the glass substrate is moving while positioned at the dispensing area.

20. The method of claim 19, wherein a plurality of containers and respective shaking devices are provided, and wherein automatically activating the shaking device comprises selectively activating one or more of the shaking devices to dispense the spacer beads onto the glass substrate.

21. The method of claim 20, wherein selectively activating one or more of the shaking devices is responsive to determination of a size and/or shape of a current glass substrate that is positioned at the dispensing area via the conveyor.

* * * * *